US00RE38770E

(19) United States
(12) Reissued Patent
Gilbert

(10) Patent Number: US RE38,770 E
(45) Date of Reissued Patent: *Aug. 9, 2005

(54) COLLAPSIBLE CONTAINER

(75) Inventor: Neil Y. Gilbert, Falmouth, ME (US)

(73) Assignee: Marshall Packaging Company, LLC, Marshall, TX (US)

( * ) Notice: This patent is subject to a terminal disclaimer.

(21) Appl. No.: 10/629,921

(22) Filed: Jul. 29, 2003

Related U.S. Patent Documents

Reissue of:
(64) Patent No.: Re. 36,377
Issued: Nov. 9, 1999
Appl. No.: 08/753,060
Filed: Nov. 20, 1996

Which Is a Reissue of:
(64) Patent No.: 5,370,250
Issued: Dec. 6, 1994
Appl. No.: 08/154,704
Filed: Nov. 18, 1993

U.S. Applications:
(63) Continuation-in-part of application No. 07/823,169, filed on Jan. 21, 1992, now Pat. No. 5,269,428.

(51) Int. Cl.[7] ..... B65D 35/28; B65D 35/56
(52) U.S. Cl. ..... 215/382; 215/395; 220/666; 220/672; 220/675; 222/95; 222/105; 426/111; 426/394
(58) Field of Search ..... 220/666, 669, 220/670, 672, 673, 675, 907, 720; 215/11.3, 382, 376, 395; 222/95, 105, 107, 104, 212–215; 426/111, 394

(56) References Cited

U.S. PATENT DOCUMENTS

| | | | | |
|---|---|---|---|---|
| 2,139,143 A | | 12/1938 | Wiswell | |
| 2,899,110 A | | 8/1959 | Parker | |
| 3,155,281 A | | 11/1964 | Straley | |
| 3,240,567 A | * | 3/1966 | Caparreli et al. | 222/215 |
| 3,438,578 A | | 4/1969 | Peterson et al. | |
| 3,833,154 A | * | 9/1974 | Markowitz | 222/212 |
| 3,872,994 A | | 3/1975 | Hyde | |
| 3,873,003 A | | 3/1975 | Seiferth et al. | |

(Continued)

FOREIGN PATENT DOCUMENTS

| | | | |
|---|---|---|---|
| EP | 408929 | A3 | 1/1991 |
| EP | 408929 | A2 | 1/1991 |
| EP | 528754 | A1 | 2/1993 |
| EP | 644121 | A1 | 3/1995 |
| EP | 722888 | A1 | 7/1996 |
| FR | 2259754 | | 8/1975 |
| FR | 2316132 | | 1/1977 |
| FR | 2504095 | | 10/1982 |
| FR | 2607109 | | 5/1988 |
| JP | 53143485 | | 12/1978 |
| JP | 551036 | A | 3/1993 |
| WO | WO9405555 | | 3/1994 |

OTHER PUBLICATIONS

The Wall Street Journal, Wed. Aug. 11, 1993: "Pepsi Puts Spotlight on New Packaging," pp B1 and B6.

*Primary Examiner*—Nathan J. Newhouse
(74) *Attorney, Agent, or Firm*—Neil Y. Gilbert

(57) ABSTRACT

A collapsible container is disclosed having a top portion and a base portion joined by a generally cylindrical side wall structure, the generally cylindrical side wall structure has a central axis and a collapsible helical portion and the collapsible helical portion has a generally uniform radius and a generally flat side cross sectional shape with respect to the central axis. A cup section is also disclosed which can cause deformation of the collapsible container's side wall. The container is particularly suitable to store carbonated beverages and other consumer products.

61 Claims, 4 Drawing Sheets

U.S. PATENT DOCUMENTS 3,918,603 A 11/1975 Hatada
3,946,903 A * 3/1976 Parker ..... 222/92
4,044,836 A 8/1977 Martin et al.
4,213,933 A 7/1980 Cambio
4,316,551 A 2/1982 Belokin, Jr.
4,324,340 A 4/1982 Belokin, Jr.
4,386,926 A 6/1983 Heller
4,438,856 A 3/1984 Chang
4,456,134 A 6/1984 Cooper
4,492,313 A 1/1985 Touzani
4,572,412 A 2/1986 Brach et al.
4,610,366 A 9/1986 Estes et al.
4,773,458 A 9/1988 Touzani
4,775,564 A 10/1988 Shriver et al.
4,790,361 A 12/1988 Jones et al.
4,943,780 A 7/1990 Redding
4,955,493 A 9/1990 Touzani
5,100,017 A 3/1992 Ishinabe et al.
5,174,458 A 12/1992 Segati
5,201,438 A 4/1993 Norwood
5,209,372 A 5/1993 Norwood
5,226,551 A 7/1993 Robbins, III
5,236,204 A 8/1993 Hempel
5,238,129 A 8/1993 Ota
5,238,150 A 8/1993 Williams
5,240,130 A 8/1993 Osbakk
5,244,105 A 9/1993 Serre
5,269,428 A 12/1993 Gilbert
5,310,068 A 5/1994 Saghri
5,407,093 A 4/1995 McGill et al.
5,441,174 A 8/1995 Sperry
5,518,046 A 5/1996 Furukawa et al.
5,632,397 A 5/1997 Fandeux et al.
D381,558 S 7/1997 Schaefer et al.
5,642,826 A 7/1997 Melrose

* cited by examiner

COLLAPSIBLE CONTAINER

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue.

This application is a continuation-in-part of co-pending U.S. application Ser. No. 07/823,169, filed Jan. 21, 1992, now U.S. Pat. No. 5,269,428.

BACKGROUND OF THE INVENTION

1. Field of the Invention

The present invention relates to a novel collapsible container and collapsible container system which enables the user to gradually increase or decrease the internal volume of a collapsible container.

2. Setting of the Invention

A general problem with many containers, particularly containers holding substances that are intermittently dispensed or filled, is that the container's internal volume may be essentially fixed and, therefore, does not increase or decrease as substances are added or removed. This results in inefficient use of storage space and potential adverse effects to the substances which remain in the container. Some containers which do collapse during use, for example tubes of pasty substances, also have drawbacks. Inefficient collapsation of these containers can result in inaccessible product remaining in the container or careless collapsation can result in wasted product.

To overcome these drawbacks, the present invention conceives a novel collapsible container and collapsible container system which enables a user to gradually, fixedly and efficiency increase or decrease the internal volume of a collapsible container, thereby allowing a controlled manipulation of the internal volume of the container. The present invention does not collapse by means of over centering circular bellows (disclosed in U.S. Pat. No. 4,492,313—Touzani) or latching bellows (disclosed in U.S. Pat. No. 4,773,458—Touzani), but utilizes helical fold regions. Collapsible containers having helical bellows are disclosed in U.S. Pat. Nos. 3,155,281 (Stracey) and 3,873,003 (Seiferth, et at.). A drawback with each of these designs is that the container external surface is extremely contoured due to the bellow-type configuration. The bellowed contours not only require more material for manufacture, but also make labeling difficult or impractical.

One use of the present invention is to aid consumers of carbonated beverages. A common problem with the storage of carbonated liquids is significant loss of carbonation from the liquid prior to complete consumption. Each time liquid is dispensed or carbonating gas is exhausted from the container and the container resealed, more carbonating gas leaves the liquid phase to reach equilibrium in the gas phase within the container. Therefore, even a properly closed and sealed container cannot prevent the loss of carbonation to the gaseous space above the liquid. In a container of fixed internal volume, the decrease in liquid volume equals the increase in internal gas volume. Thus, as the liquid contents decreases through multiple usage, increasingly significant amounts of carbon dioxide is lost to the gaseous space, resulting in a "flat" liquid.

This problem may be overcome by constructing a container which allows the user to reduce the overall volume within the container as the contents is dispensed. By reducing the internal volume of the container or, more specifically, the volume of gaseous space above carbonated liquids, less carbonation will be lost from the liquid, resulting in increased use and enjoyment of carbonated drinks by the consumer.

The invention can be used to aid in dispensation of the collapsible container's contents. Whether the contents are of low viscosity (for example, a free flowing liquid) or of high viscosity (for example, a slurry, cream or paste), the disclosed and claimed collapsible container system provides an excellent way to effectuate controlled flow from the container.

Yet another use for the invention is that of drawing or sucking substances into the collapsible container. This drawing or sucking action can be achieved by manipulating the collapsible container system to cause an expansion of a collapsed container, while ensuring that the increase in volume of the container is at least partially a result of an intake of the desired substance.

Another use for the disclosed and claimed collapsible container and collapsible container system is to reduce the amount of volume of vapors which may form above various volatile liquids when such liquids are stored in closed containers. Not only do vapors represent lost liquid, but some vapors can also present a significant safety hazard if flammable.

Accordingly, there is a need to provide a collapsible container and collapsible container system which enables a user to gradually, controllably and fixedly increase or decrease the internal volume of a container. There is also a need to provide a novel and useful improvement to plastic containers containing carbonated beverages by providing a way for the user to effectuate a controlled, gradual decrease in the container's overall internal volume, thereby decreasing the gaseous space above the liquid contents, resulting in reduced loss of carbonation from the liquid during storage. Indeed, in the $48 billion soft-drink industry, there is a great need for innovative packaging (see, e.g., The Wall Street Journal, "Pepsi Puts Spotlight on New Packaging", Wednesday Aug. 11, 1993, Page B1).

There is also a need for a collapsible container system which provides a user with the capability of controlling the flow of substances to or from a collapsible container. There is yet another need to provide a collapsible container and collapsible container system that enables the user to reduce the amount of vapors above volatile liquids in closed container systems. There is also a need for a relatively smooth surfaced collapsible container.

SUMMARY OF THE INVENTION

In one form of the present invention, the side wall of a container includes at least one helical groove and/or preferential fold region. These helical structures permit an inwardly extending helical member, such as helical thread or screw portion of a cup, to follow the contour of the container's helix. When the cup is located at the base of the container and rotated about the container's axis by applying a torque between the container and cup section, the cup section will travel along a helical preferential fold region or groove of the container's side wall. This movement will cause the cup to move in an axial direction, relative to the central axis of the container, further causing the side wall of the container being acted upon by the cup to move axially.

Such movement of the side wall will cause a change of distance between the top portion and the bottom portion of the container, thereby changing the internal volume of the container. Thus, for example, to decrease the collapsible container's internal volume, the cup section can be urged upward along a centrally oriented apex of a helical contour or groove of the container. This movement will draw the side wall of the container into the cup section, causing the side walls of the container to fold and aggregate in the cup. Folding may take place along preferential fold regions in the collapsible container's side wall. Rotation of the cup in an upward direction will decrease the vertical height of the container, resulting in an overall decrease in the container's internal volume. This rotation of the cup, and resultant decrease in container volume, can be effectuated intermittently as desired until the entire helical side wall is within the cup or until the space below the cup's helical screw portion has reached maximum capacity of the container's side wall. Rotation of the cup in the opposite direction will cause the side wall of a collapsed container to unfold, resulting in an increase in the container's overall internal volume.

In a preferred embodiment, a collapsible container is provided comprising a top portion and a base portion joined by a generally cylindrical side wall structure, the generally cylindrical side wall structure having a central axis and a collapsible helical portion, the collapsible helical portion having a generally uniform radius and a generally flat side cross sectional shape with respect to the central axis. The generally cylindrical side wall structure is compressible from an extended position to a compressed position, wherein the distance between the top portion and the bottom portion is less in the compressed position than in the extended position.

In a most preferred embodiment, the collapsible container has a helical groove generally oriented towards the container's central axis. The groove is configured and dimensioned to be engageable with helical threads of a cup portion. Rotation of the cup portion relative to the collapsible container causes the collapsible helical portion between adjacent revolutions of the helical groove to deform.

Other preferred forms of the collapsible container and collapsible container system, as well as other embodiments, features and advantages of this invention, will be apparent from the following detailed description of the invention, which is to be read in connection with the accompanying drawings.

CHARACTERIZATION OF THE DRAWINGS

Figure 5:
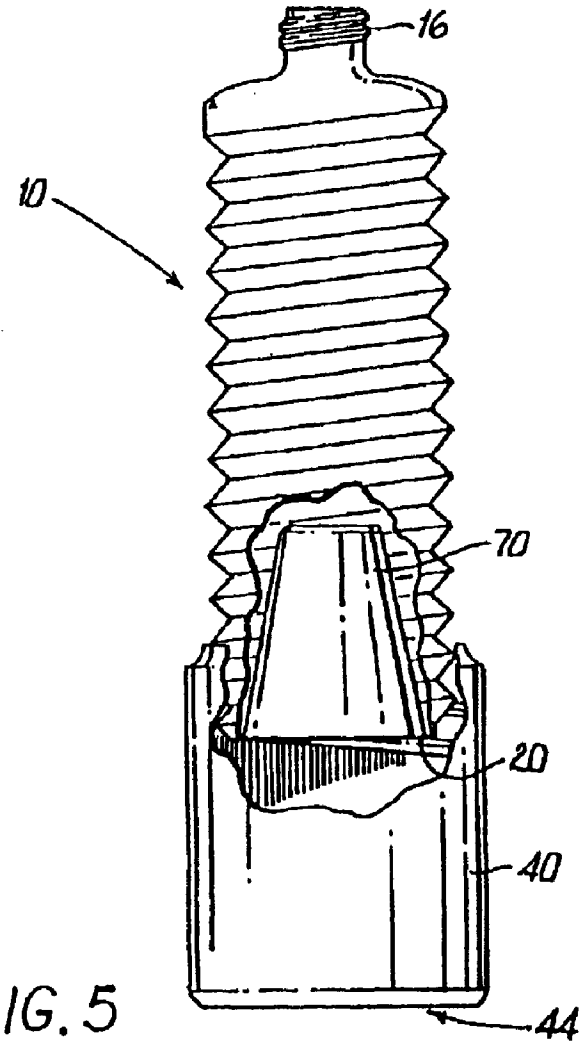

FIG. 5 is a side view of a collapsible container system wherein the collapsible container has a helical bellow and an elevated base and wherein the cup section has engaged the exterior of the collapsible container but has not been rotated sufficiently to cause collapsation of the collapsible container wall. This particular collapsible container also has an elevated base portion within the container.

Figure 6:
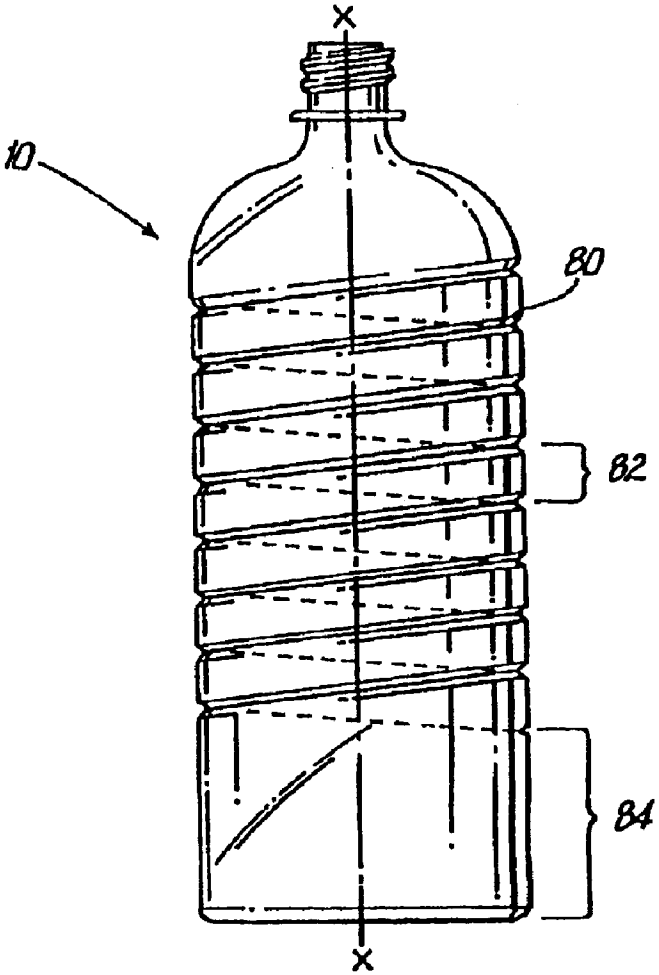

FIG. 6 is a side view of a preferred embodiment of a collapsible container with a helical groove and a generally flat collapsible helical portion defined between adjacent revolutions of the helical groove.

Figure 7:
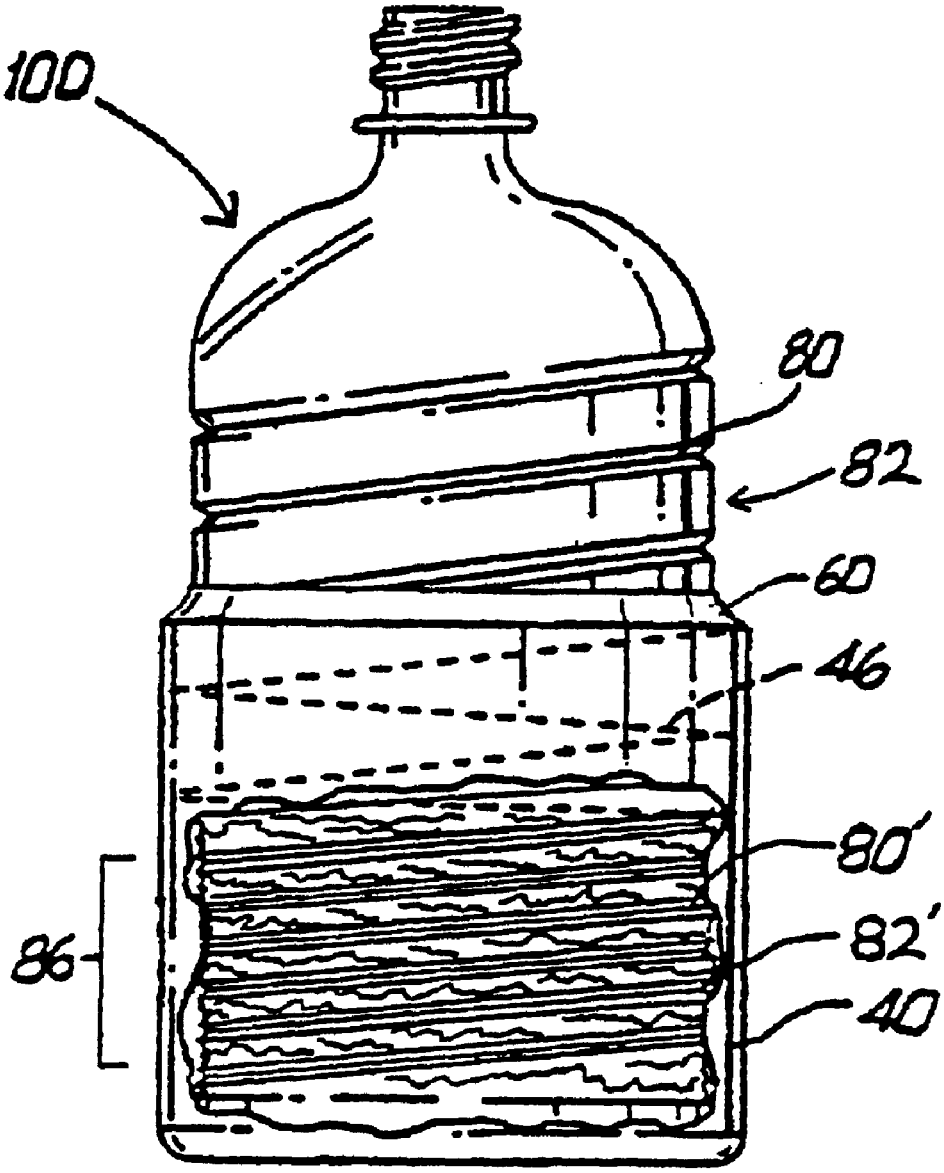

FIG. 7 is a side plan cutaway view of a preferred collapsible container system, having the collapsible container of FIG. 6 partially collapsed within a cup portion.

DETAILED DESCRIPTION OF THE INVENTION

Figure 1:
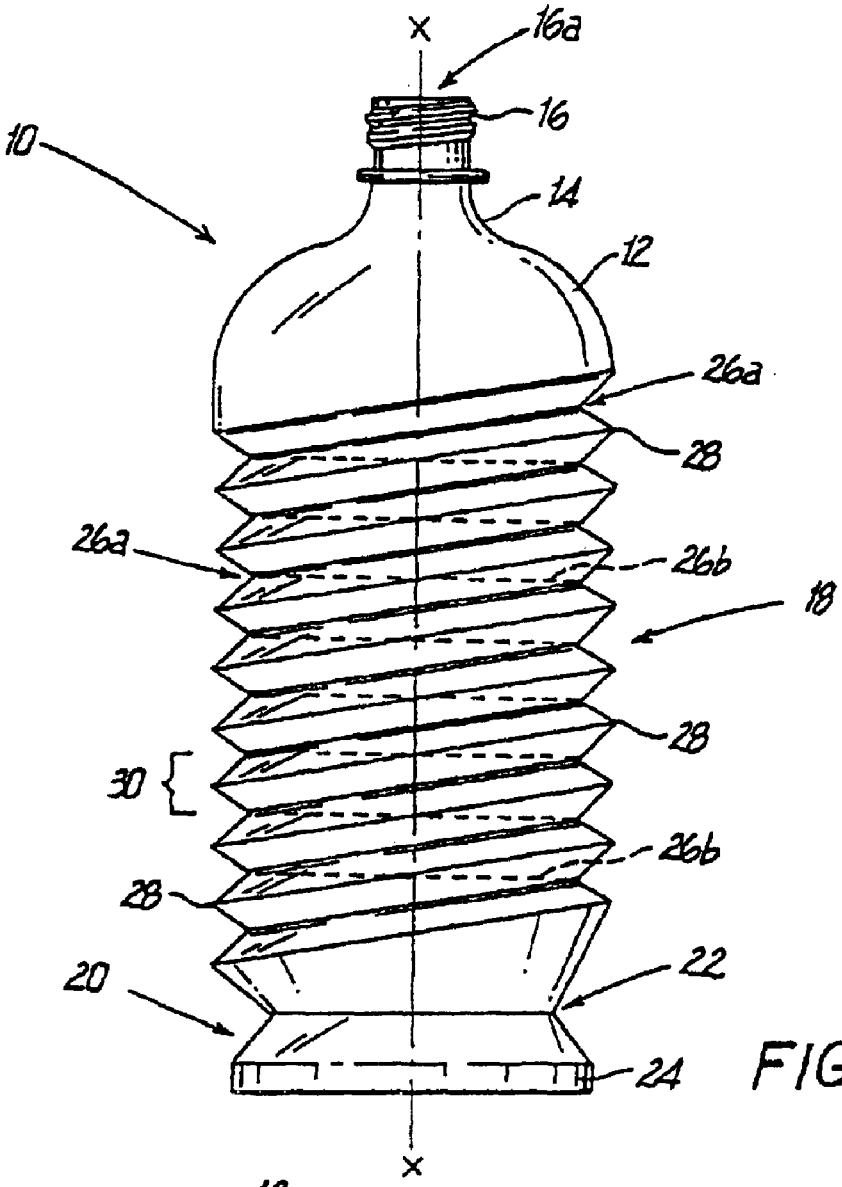
FIG. 1 is a side view of a collapsible container having a helical bellow.

Referring to FIG. 1, the collapsible container, generally denoted by 10, includes a hemispherical top portion 12 and a base portion 20 joined by a generally cylindrical, intermediate side wall structure 18 integral with and joining the top and base portion. The top portion 12 has a neck 14 a neck finish 16, that is suitable for receiving a closure than can be attached and detached, and an aperture 16a. Such a closure can, for example, take the form of a screw-on closure or of various types of snap-on closures. Hoses or other similar attachment (not shown), useful for directing flow of substances to or from the collapsible container, can also be attached to the neck finish 16. The base portion, in this particular example, includes a circular bellow collapsation region 22. As seen in FIG. 5 and FIG. 6, the circular bellow collapsation region 22 of FIG. 1 is not a necessary element of the current invention in that the side wall 18 can terminate at the circular bottom disk 24.

The side wall structure 18 has two helical preferential fold regions. Helical preferential fold region 26a is oriented toward the longitudinal central axis X—X, which represents the central axis for both collapsible container 10 and the generally cylindrical side wall 18. Preferential fold region 26a is continuous from the top portion 12 to the base portion 20. The parallel dotted lines 26b denote helical preferential fold region 26a as seen through to the back side of collapsible container 10. The second continuous helical preferential fold region is denoted by 28 and is oriented away from central axis X—X. Helical preferential fold region 28 is of generally the same pitch as helical preferential fold region 26a, but greater in diameter. The two helical preferential fold regions 26a and 28 form a continuous helical bellow 30 which is generally conical in shape. As external forces along central axis X—X act on the collapsible container, the helical bellow 30 allows for the side wall 18 of the collapsible container 10 to collapse. In the figure, eight complete turns of the helical bellow are shown. In actual practice, however, the number of bellow turns may vary from many (small helical pitch) to few (large helical pitch). The optimum number of bellow turns will most likely depend on the size of the collapsible container, the mechanical properties of the material or materials making up the collapsible container and on the desired degree of container collapsation per helical revolution.

The generally cylindrical side wall 18 on the entire collapsible container 10 can be made of petroleum based compounds, for example, polymers (for example, polyethylene terephthalate) elastomers, and plastics. Other materials that exhibit requisite deformation characteristics and flexibility for successful collapsation and/or expansion of the container's side wall, for example, metals, alloys, and foils thereof, can also be used. If multiple collapsation and expansion cycles are foreseen, suitable materials would best be chosen from those which are sufficiently flexible so as to minimize tensile or compressive stresses, strain hardening, crazing or cracking of the side wall, particularly at or near the helical line(s) or region(s). Materials approved by the Food and Drug Administration for prolonged contact with food or beverages, for example acrylonitrile, can be particularly useful. Petroleum based collapsible containers [arc] *are* envisioned to be manufactured by injection molding and or blow molding, using available techniques (see, for example, Touzani's U.S. Pat. No. 4,492,313 disclosure). Methods for manufacturing metallic containers and containers having a multiplicity of polymeric and or metallic layers arc disclosed in Redding U.S. Pat. No. 4,943,780. Manufacturing the collapsible container such that the top portion, bottom portion and intermediate side wall structure are all generally thin-walled structures, will aid in reducing the cost of manufacture. Preferred internal volume capacity of the collapsible container can range from a few milliliters, i.e., for extremely precise volume control, to several liters. When used for consumer products such as carbonated or uncarbonated beverages, preferred liquid volume capacity can range from about 6 fluid ounces to about three or more liters. Most preferably, containers are sized to contain about seven, eight, 12, 16, 20 or 24 fluid ounces; about one, two, three or four quarts; or about three-tenths, one, two or three liters.

The side wall 18 of collapsible container 10 can provide a suitable area for labels to be affixed to the collapsible container. Adhesive may be used to join a label to the exterior of preferential fold region 28, or available "shrink-wrap" techniques could be used to secure a label around the collapsible container (see FIG. 3 description for further discussion regarding labeling).

Figure 2:
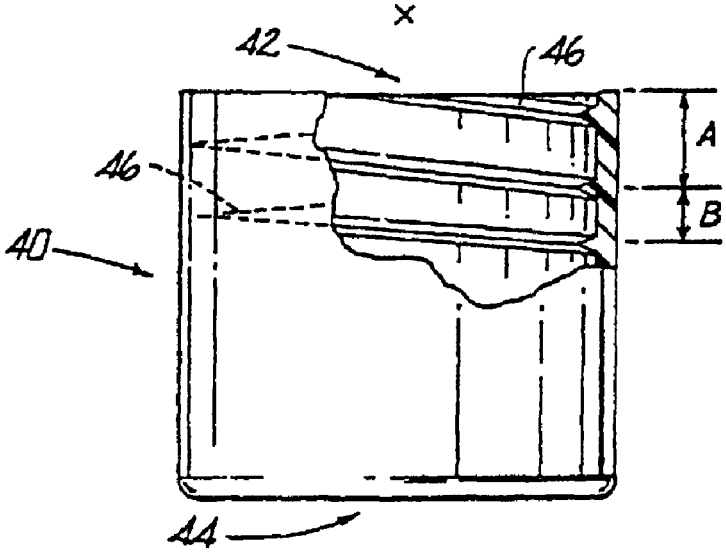
FIG. 2 is a side view of a cup with internal helical threads traveling 720°.

A generally cylindrical open cup 40 is illustrated in FIG. 2. The cup 40 is open at the top 42 and closed at the bottom 44. The cup has an internal helical thread or screw portion 46 that begins at or near the top 42 of the cup. Thread 46 travels greater than one revolution and varies in pitch. As illustrated in FIG. 2, thread 46 decreases in pitch in the downward direction. This decrease in helical pitch is further illustrated by dimension A being greater than dimension B. An increase in pitch in the downward direction, not shown, can be achieved by having the thread travel so that dimension B is greater than dimension A. Varying the pitch of the cup's threading will effect the movement of the helical fold regions within the cup. The cup is preferably plastic but may also be metallic or of other rigid material.

Figure 3A:
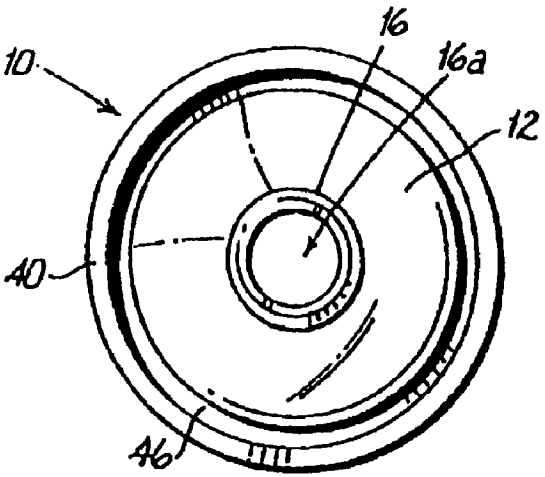
FIG. 3a is a top view of FIG. 3.
Figure 3:
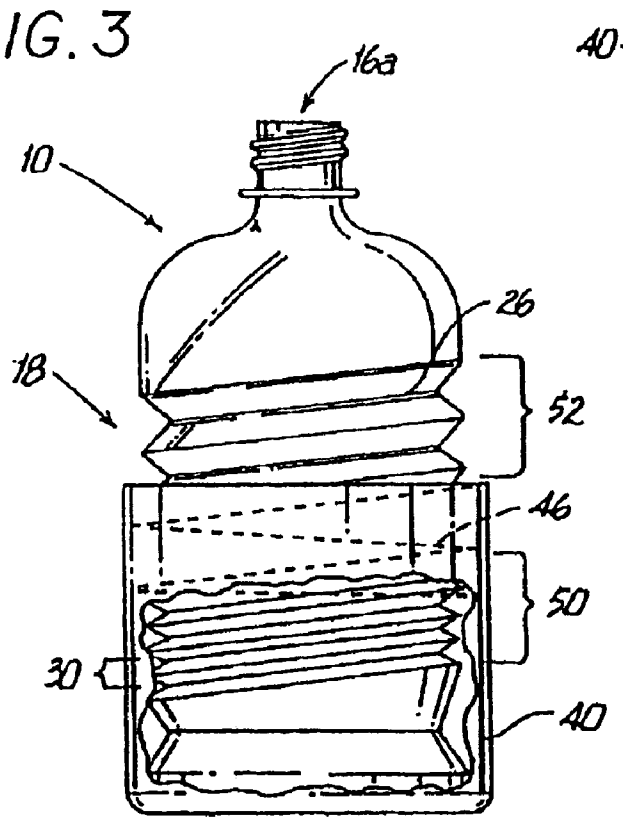
FIG. 3 is a side cutaway view of a collapsible container system, having a collapsible container and cup, after the cup's threads have engaged the side walls of the collapsible container and rotated relative thereto, causing the container to collapse within the cup.

The collapsible container system in FIG. 3 has the collapsible container of FIG. 1 and the cup of FIG. 2. The collapsible container 10 is partially collapsed. The collapsed portion 50 of the collapsible container's side wall 18 is below the cup's helical thread 46 and is made up of five bellow turns. The uncollapsed portion 52 is above the cup's helical thread 46 and is made of three bellow turns. Forces, such as friction, between the helical threads of the cup and the bellow contacted thereby cause the system to be in a static, stable state. Movement of the cup 40 in a counter clockwise direction relative to the collapsible container 10 (as looking down axis X—X from the top of the container) will cause the cup thread or screw portion 46 to travel along preferential helical fold line or region 26, urging the uncollapsed portion 52 of the collapsible container side wall 18 below helical thread or screw portion 46. Thus, this relative motion causes the side wall 18 to collapse and collect within the cup 40.

A counter clockwise rotational motion of the cup 40 relative to the collapsible container 10 decreases the height of the collapsible container 10 and, therefore, decreases the collapsible container's inner volume. If the collapsible container contains, for example, a free-flowing liquid, collapsation can be effected until the liquid level reaches a desired level within the collapsible container. Collapsation may be effected intermittently, such as after each partial dispensation of the collapsible container's contents. If the collapsible container contains, for example, a liquid or more viscous substance, and the user wishes to cause the substance within the container to pass through the container's top portion aperture 16a, the cup section may be rotated to and force the substance through the aperture.

The collapsible container system can [aim] *also* be used to draw or suck various substance into the collapsible container by applying torsion forces to the system that can cause the cup section to move in a clockwise direction relative to the collapsible container. Manipulation of the pitch of the cup portion's threading, the number of thread rotations, and or the height of the cup, will effect the control over the collapsible container's internal volume while returning the cup. Some applications of the system may require materials that will withstand multiple cycles of clockwise and counter-clockwise movements of the base portion.

Labeling (not shown) affixed to side wall 18 of collapsible container 10, should be such that it does not interfere with the interaction of the cup's helical thread 46 with the collapsible container's helical bellow 30. Such labels may be of paper or plastic which either tear or yield when acted upon by the helical thread. The torn or yielded label may then pass into and be collected in cup 40 below helical thread 46.

A top view of FIG. 3 is shown in FIG. 3a.

Figure 4:
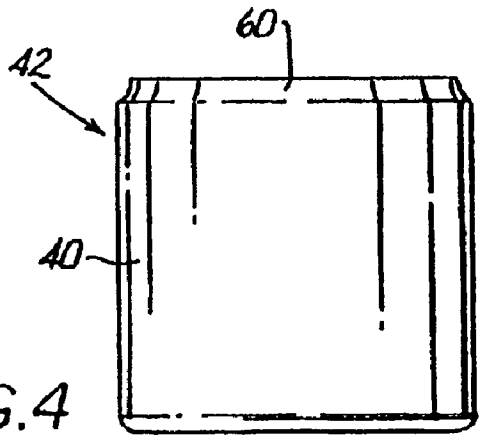
FIG. 4 is a side view of a cup having a skirt or lip portion extending from the top portion of the cup.

FIG. 4 is similar to FIG. 2 but has an additional [skin] *skirt* 60 affixed to and integral with the top 42 of the cup 40. The purpose of the skirt 60 is to generally prevent or inhibit debris or other foreign matter from entering the cup 40 when the cup is engaged with a collapsible container (see, e.g. FIG. 5).

Another collapsible container system is illustrated in FIG. 5. The collapsible container 10 is tubular and has no circular bellow, as opposed to FIG. 1, at the collapsible container's base 20. This particular embodiment of the collapsible container has an elevated base portion 70. One purpose of this elevated base portion is to aid in the dispensation of the collapsible containers contents, which would otherwise remain in the collapsible container when the cup thread reaches the top portion of the collapsible container. Another purpose of the elevated base portion may be to guide the collapsible container's side wall as it collapses into the cup, aiding in efficient collapsation. The elevated base portion 70 may be formed during the manufacture of the collapsible container using available techniques (see, for example, Touzani's U.S. Pat. No. 4,773,458 disclosure). The cup 40 has a skirt 60 as depicted in FIG. 4. Cup 40 will need to be rotated counter clockwise, relative to collapsible container 10, approximately three full turns before the cup's base 44 engages the collapsible container's base 20. After the collapsible container's base and the cup's base engage, further rotation of the cup will cause the collapsible container to collapse, further causing dispensation of the collapsible container's contents through the opening of the container's neck 16.

An alternative, preferred embodiment of the present invention is illustrated in FIGS. 6 and 7. Collapsible container 100 has helical groove 80 and collapsible helical portion 82 defined between adjacent revolutions of helical groove 80. Collapsible helical portion 82 has a generally uniform radius and a generally flat side cross sectional shape with respect to longitudinal central axis X—X, thereby defining a surface extending generally parallel with respect to the central axis. The overall outer surface of collapsible container 100 is smoother than the other embodiments and, therefore, provides an improved surface for labeling. Base portion 84 of collapsible container 100, below helical groove 80, can also be manufactured to fold or [other, vise] *otherwise* deform to facilitate collapsation.

When compression forces act on container 100 in a direction generally parallel to central axis X—X, collapsible helical portion 82 can fold and/or deform to facilitate collapsation of the container. With reference to FIG. 7, a collapsible container system is shown wherein compression forces are provided by helical cup threads 46 of cup 40 traveling along helical groove 80, in a manner similar to that described above. The collapsed portion 86 of container 100 is located below threads 46 and includes deformed collapsible helical portion 82' and deformed helical groove 80'. Cup 40 is shown with skirt 60 as depicted in FIG. 4. Suitable cup configurations include cups with internal helical threads of either constant or variable pitch. Collapsation of at least a portion of the container's side wall results in a decrease of the internal volume of the container.

When collapsible container 100 is used to store and dispense consumer products, i.e., carbonated beverages or viscous substances such as pastes or condiments, the packager can provide a collapsible container system according to the present invention and fill the container with the substance. The consumer can then collapse the container in stages as the substance is used by turning cup portion 40 relative to container 100. Relative rotation of the cup and container causes the container to move from an extended position to a compressed position, thereby causing the distance between the top portion and the bottom portion of the container to decrease.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A longitudinally collapsible container comprising a top portion and a base portion joined by a generally cylindrical side wall structure, said generally cylindrical side wall structure having a longitudinal central axis and a collapsible helical portion, said collapsible helical portion having a collapsible surface of generally uniform radius extending generally parallel with respect to said central axis, wherein said collapsible helical portion is defined between first and second longitudinally spaced groove portions, one of said groove portions traveling at least 360° around the generally cylindrical side wall structure.

2. The collapsible container as in claim 1, wherein said generally cylindrical side wall structure is compressible from an extended position to a compressed position, wherein the distance between said top portion and said [[bottom]] base portion is less in said compressed position than in said extended position.

3. The collapsible container as in claim 1, wherein compression forces acting in a direction generally parallel with said central axis cause said collapsible helical portion to deform, thereby causing the distance between said top portion and said [[bottom]] base portion to decrease.

4. A collapsible container as in claim 1, wherein said generally cylindrical side wall structure further comprises at least one helical groove oriented towards said central axis.

5. A collapsible container as in claim [4] *1*, wherein said collapsible helical portion is defined between adjacent revolutions of a helical groove.

6. A collapsible container as in claim 1, wherein said generally cylindrical side wall structure comprises a deformable material selected from the group consisting of metal foils, polymers, elastomers, and plastics.

7. A collapsible container as in claim 6, wherein said generally cylindrical side wall structure comprises polyethylene terephthalate.

8. A collapsible container as in claim 1, further comprising a viscous substance disposed therein.

9. A collapsible container as in claim 1, further comprising a carbonated beverage disposed therein.

10. A collapsible container as in claim 1, wherein the internal volume of said container is between about 0.3 liters and about 3 liters.

11. A collapsible container as in claim 1, further comprising compression means associated with at least a portion of said generally cylindrical side wall structure for compressing said collapsible helical portion.

12. A collapsible container as in claim 11, wherein said compression means comprises a cup section.

13. A collapsible container as in claim 11, wherein said generally cylindrical side wall structure further comprises at least one helical groove oriented towards said central axis and wherein said compression means is adapted to engage said helical groove.

14. A collapsible container as in claim 13, wherein said compression means comprises a cup section having an internal thread portion, said internal thread portion being configured and dimensioned to engage said helical groove.

15. A collapsible container as in claim 14, wherein when said cup section is rotated relative to said generally cylindrical side wall structure, at least a portion of said collapsible helical portion is caused to deform.

16. A longitudinally collapsible container system comprising in combination:

a collapsible container having a top portion and a base portion joined by a generally cylindrical side wall structure, said generally cylindrical side wall structure having a longitudinal central axis, a helical groove and a collapsible helical portion defined between adjacent revolutions of said helical groove, said collapsible helical portion having a surface being generally uniform in radius and extending generally parallel with respect to said longitudinal central axis; and a cup section for engaging and retaining at least a portion of said generally cylindrical side wall structure within said cup section.

17. A collapsible container system as in claim 16, wherein rotation of said cup section relative to said collapsible container causes at least a portion of said collapsible helical portion to deform.

18. A collapsible container system as in claim 16, wherein said cup section has an internal helical thread adapted to engage said at least one helical groove.

19. A collapsible container as in claim 16, wherein said generally cylindrical side wall structure comprises a deformable material selected from the group consisting of metal foils, polymers, elastomers, and plastics.

20. A method of storing a carbonated beverage comprising:

providing a collapsible container having a top portion and a base portion joined by a generally cylindrical side wall structure, said generally cylindrical side wall structure having a central axis, a helical groove and a collapsible helical portion defined between adjacent revolutions of said helical groove, said collapsible helical portion having a surface being generally uniform in radius and extending generally parallel with respect to said central axis;

providing a cup section for engaging and retaining at least a portion of said generally cylindrical side wall structure within said cup section;

filling said collapsible container with a carbonated beverage;

dispensing a portion of said carbonated beverage; and turning said cup portion relative to said collapsible container to decrease the distance between said top portion and said [[bottom]] base portion of said container.

*21. The collapsible container as in claim 1, wherein said collapsible helical portion travels at least 360° around the generally cylindrical side wall structure.*

[[*22. The collapsible container as in claim 1, wherein said collapsible helical portion is defined between first and second longitudinally spaced groove portions.*]]

*23. The collapsible container as in claim* [[*22*]] 1*, wherein said first and second groove portions are portions of a helical groove that travels more than 360° around the generally cylindrical side wall structure.*

*24. The collapsible container as in claim* [[*22*]] 1*, wherein said first and second longitudinally spaced groove portions travel around a portion of the generally cylindrical side wall structure at generally the same pitch.*

*25. The collapsible container as in claim* [[*22*]] 1*, wherein said first and second groove portions travel upward in a counterclockwise direction as viewed from the top of the container.*

*26. The collapsible container as in claim* [[*22*]] 1*, wherein said collapsible helical portion is disposed generally adjacent said* [[*bottom*]] base *portion and at least third, fourth, fifth and sixth longitudinally spaced groove portions are disposed longitudinally above the collapsible helical portion.*

*27. A longitudinally collapsible container comprising a top portion and a base portion joined by a generally cylindrical side wall structure, said generally cylindrical side wall structure having a longitudinally central axis and a collapsible surface portion, said collapsible surface portion having a collapsible surface of generally uniform radius extending generally parallel with respect to said central axis and being disposed between first and second longitudinally spaced groove portions, wherein said first groove portion travels* at least 360° around the generally cylindrical side wall structure and *around a portion of the generally cylindrical side wall structure in an upward direction, away from the* [[bottom]] base *portion and towards the top portion of the container.*

*28. The collapsible container as in claim 27, wherein said first groove portion is a portion of a helical groove.*

*29. The collapsible container as in claim 27, wherein at least a portion of said first groove portion is angled at a constant pitch.*

[[*30. The collapsible container as in claim 27, wherein said first groove portion travels at least 360° around the generally cylindrical side wall structure.*]]

*31. The collapsible container as in claim 27, wherein said first and second groove portions are portions of a helical groove that travels more than 360° around the generally cylindrical side wall structure and the collapsible surface is defined between the upper and lower longitudinally spaced portions of the helical groove.*

*32. The collapsible container as in claim 27, wherein at least portions of said first and second groove portions are angled at generally the same pitch and travel around a portion of said generally cylindrical side wall structure, thereby defining a collapsible helical portion therebetween.*

*33. The collapsible container as in claim 27, wherein said first groove portion travels upward in a counterclockwise direction as viewed from the top of the collapsible container.*

*34. The collapsible container as in claim 27, wherein said first and second groove portions travel upward in a counterclockwise direction as viewed from the top of the collapsible container, thereby defining a collapsible helical portion therebetween that also travels upward in a counterclockwise direction as viewed from the top of the collapsible container.*

*35. The collapsible container as in claim 34, wherein both said first and second groove portions are portions of a helical groove that travels more than 360° around the generally cylindrical side wall structure.*

*36. The collapsible container as in claim 27, wherein compression forces acting in a direction generally parallel with said central axis cause said collapsible surface portion to deform, thereby causing the distance between said top portion and said* [[*bottom*]] base *portion to decrease.*

*37. A collapsible container as in claim 27, wherein said generally cylindrical side wall structure comprises a deformable material selected from the group consisting of metal foils, polymers, elastomers, and plastics.*

*38. A collapsible container as in claim 37, wherein said generally cylindrical side wall structure comprises polyethylene terephthalate.*

*39. A collapsible container as in claim 27, further comprising compression means associated with at least a portion of said generally cylindrical side wall structure for compressing said collapsible surface portion.*

*40. A collapsible container as in claim 39, wherein said compression means comprises a cup section.*

*41. A longitudinally collapsible container comprising a top portion and a base portion joined by a generally cylindrical side wall structure, said generally cylindrical side wall structure having a longitudinal central axis and a plurality of longitudinally spaced collapsible surface portions disposed between the top and* [[*bottom*]] base *portions, one or more said collapsible surface portions having a collapsible surface of generally uniform radius extending generally parallel with respect to said central axis and being defined between adjacent longitudinally spaced groove portions, wherein a first of said groove portions is generally disposed adjacent said top portion and a second of said groove portions is disposed longitudinally below said first groove portion* and travels at least 360° around the generally cylindrical side wall structure, *both said first and second groove portions traveling around a portion of the generally cylindrical side wall structure in an upward direction away from the* [[*bottom*]] base *portion and towards the top portion of the container, thereby defining one said collapsible surface portions therebetween that also travels about a portion of the generally cylindrical wall structure in an upward direction.*

[[*42. The collapsible container as in claim 41, wherein the second groove portion is a portion of a groove that travels at least 360° around the generally cylindrical side wall structure.*]]

*43. The collapsible container as in claim 41, wherein the first and second longitudinally spaced groove portions are portions of the same helical groove that travels more than 360° around the generally cylindrical side wall structure.*

*44. The collapsible container as in claim 41, wherein portions of both said first and second groove portions travel in an upward, counterclockwise direction as viewed from the top of the collapsible container.*

*45. The collapsible container as in claim 41, wherein the collapsible surface portion defined between the first and second groove portions travels at least 360° around said generally cylindrical side wall structure.*

*46. The collapsible container as in claim 41, wherein a third groove portion is generally disposed adjacent said* [[bottom]] base *portion, is longitudinally spaced from said first and second groove portions and travels around a portion of the generally cylindrical side wall structure in an upward direction away from the* [[*bottom*]] base *portion towards the top portion of the container.*

*47. The collapsible container as in claim 46, wherein the first, second and third groove portions are portions of the same helical groove that travels more than two times around the generally cylindrical side wall structure.*

*48. The collapsible container as in claim 46, wherein at least six longitudinally spaced collapsible surface portions are disposed between the second and third groove portions.*

*49. The collapsible container as in claim 41, wherein compression forces acting in a direction generally parallel with said central axis cause one or more said collapsible surface portions to deform, thereby causing the distance between said top portion and said* [[*bottom*]] base *portion to decrease.*

*50. A collapsible container as in claim 41, wherein said generally cylindrical side wall structure comprises a deformable material selected from the group consisting of metal foils, polymers, elastomers, and plastics.*

*51. A collapsible container as in claim 50, wherein said generally cylindrical side wall structure comprises polyethylene terephthalate.*

*52. A collapsible container as in claim 41, wherein the internal volume of said container is between about 0.3 liters and about 3 liters.*

*53. A collapsible container as in claim 41, further comprising compression means associated with at least a portion of said generally cylindrical side wall structure for compressing one or more said collapsible surface portions.*

*54. A collapsible container as in claim 53, wherein said compression means comprises a cup section.*

*55. A longitudinally collapsible container comprising a top portion and a base portion joined by a generally cylindrical side wall structure, said generally cylindrical side wall structure having a longitudinal central axis and a plurality of longitudinally spaced collapsible surface portions disposed between the top and* [[*bottom*]] base *portions, at least one said collapsible surface portions having a collapsible surface of generally uniform radius extending generally parallel with respect to said central axis and being defined between first and second longitudinally spaced groove portions, said first groove portion being generally disposed adjacent the* [[*bottom*]] base *portion and said second groove portion being disposed longitudinally above said first groove portion, both said first and second groove portions traveling about a portion of the generally cylindrical side wall structure in an upward direction away from the* [[*bottom*]] base *portion and towards the top portion of the container, wherein the second groove portion travels in an upward, counterclockwise direction as viewed from the top of the container,* the collapsible container also having a third groove portion disposed longitudinally above said first and second groove portions, the third groove portion traveling at least 360° around said generally cylindrical side wall structure.

*56. The collapsible container as in claim 55, wherein the first groove portion also travels in an upward, counterclockwise direction as viewed from the top of the container, thereby defining a collapsible helical portion therebetween.*

*57. The collapsible container as in claim 56, wherein the first and second groove portions are portions of a helical groove that travels more than 360° around said generally cylindrical side wall structure.*

*58. The collapsible container as in claim 55, wherein the collapsible surface portion defined between the first and second groove portions travels at least 360° around said generally cylindrical side wall structure.*

[[*59. The collapsible container as in claim 55, wherein a third groove portion is disposed longitudinally above said first and second groove portions, the third groove portion traveling at least 360° around said generally cylindrical side wall structure.*]]

*60. The collapsible container as in claim 55, wherein compression forces acting in a direction generally parallel with said central axis cause one or more said collapsible surface portions to deform, thereby causing the distance between said top portion and said* [[*bottom*]] base *portion to decrease.*

*61. A collapsible container as in claim 55, wherein said generally cylindrical side wall structure comprises a deformable material selected from the group consisting of metal foils, polymers, elastomers, and plastics.*

*62. A collapsible container as in claim 61, wherein said generally cylindrical side wall structure comprises polyethylene terephthalate.*

*63. A collapsible container as in claim 55, wherein the internal volume of said container is between about 0.3 liters and about 1.3 liters.*

*64. A collapsible container as in claim 55, further comprising compression means associated with at least a portion of said generally cylindrical side wall structure for compressing at least one said collapsible surface portions.*

*65. A collapsible container as in claim 64, wherein said compression means comprises a cup section.*

* * * * *